United States Patent [19]

Spinder

[11] Patent Number: 4,940,022
[45] Date of Patent: Jul. 10, 1990

[54] FEEDING GATE

[75] Inventor: Pieter Spinder, Le Harkema, Netherlands

[73] Assignee: Spinder Stalinrichting B.V., Le Harkema, Netherlands

[21] Appl. No.: 284,917

[22] Filed: Dec. 14, 1988

[30] Foreign Application Priority Data

Dec. 16, 1987 [NL] Netherlands ................. 8703045

[51] Int. Cl.⁵ .............................................. A01K 1/08
[52] U.S. Cl. ................................. 119/148; 119/147.1
[58] Field of Search .............. 119/147, 148, 149, 27, 119/150

[56] References Cited

U.S. PATENT DOCUMENTS 4,457,265 7/1984 Anderson ..................... 119/148

FOREIGN PATENT DOCUMENTS 8000505 8/1981 Netherlands .................. 119/148
8103259 2/1983 Netherlands .................. 119/148

Primary Examiner—John Weiss
Attorney, Agent, or Firm—Zarley McKee, Thomte, Voorhees & Sease

[57] ABSTRACT

A feeding gate of the type comprising tiltable closing pipes and a rectilinearly movable member to latch and unlatch the closing pipes is centrally latchable and unlatchable. The operating member has a recess in the horizontal leg for centrally latching the closing pipes and the vertical leg has an obliquely rising edge for centrally unlatching the closing pipes.

12 Claims, 1 Drawing Sheet

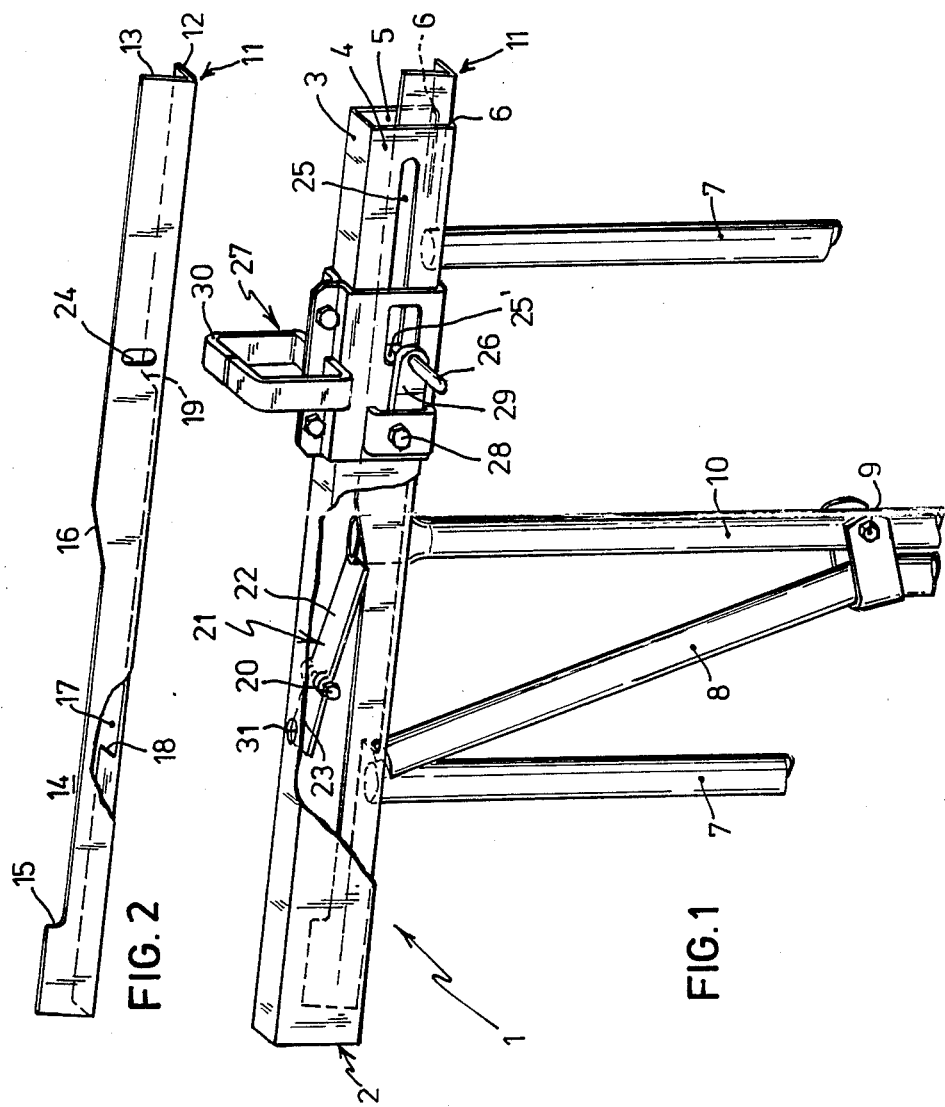

4,940,022

FEEDING GATE

BACKGROUND OF THE INVENTION

The invention relates to a feeding gate comprising a number of feeding openings that can be opened and closed by means of tiltable closing pipes. The gate has a closing mechanism that can be unlatched or latched, respectively, by means of an operating member comprising recesses and being disposed entirely within an upper, U-shaped profile beam. The operating member is slidable in the longitudinal direction of the gate, within the recesses being disposed in the immediate vicinity of a latch that is mounted pivotably in the profile beam. The latch has an end that is automatically received in the recess upon latching, which latching operation can be disconnected for all closing pipes simultaneously or for each closing pipe separately.

Such a feeding gate is known from Dutch patent application No. 84-00919 of Applicant. If one wishes to close the closing pipes, this cannot be done in one single action, as all closing pipes have to be moved manually one by one. That is a time-consuming affair. It is desirable to be able to close all the feeding openings simultaneously if one wants to lay out the feed but one does not want the animals to start eating right away.

SUMMARY OF THE INVENTION

The present invention aims to improve the above situation. According to the invention, this object is attained in that the operating member has an L-shaped cross-section with a recess in the horizontal leg for centrally closing and, if desired, also centrally opening the feeding openings, and in that the recess in the vertical leg has an obliquely rising edge for centrally unlatching the closing pipes.

In a preferred embodiment, the vertical leg of the operating member is provided with an elongated hole and at least one of the legs of the profile beam with a staggered slit, a pin of a driving means of the operating member, slidable along the profile beam, projecting through said elongated hole and staggered slit, the step in the staggered slit corresponding to the position in which the latch can latch a closing pipe.

BRIEF DESCRIPTION OF THE DRAWINGS

The invention will be elucidated hereafter on the basis of the drawing, showing, by means of example, an upper portion of a feeding gate according to the invention. In the drawing:

FIG. 1 shows in perspective the upper portion of one feeding opening of a feeding gate according to the invention, and FIG. 2 shows a portion of an operating member of the feeding gate of FIG. 1.

DESCRIPTION OF THE PREFERRED EMBODIMENTS

The feeding gate 1 comprises at its top a reversed U-shaped profile beam 2 with body 3 and two legs 4 and 5, comprising at their bottom inwardly directed flanges 6. A straight pipe 7 and a buckled pipe 8 have been connected to the flanges. The buckled pipe 8 comprises, in the known manner, a pivot 9 for a tiltable closing pipe 10. Part of the leg 4 has been cut out in FIG. 1 so as to display the interior.

In the profile beam 2 an L-shaped operating member 11 with horizontal leg 12 and vertical leg 13 is slidable, part of the vertical leg 13 having been cut out in FIG. 2 so as to display a recess 17 in the horizontal leg 12, which recess is situated behind it. The vertical leg has a recess 14 with an end 15 and an obliquely rising edge 16. The recess 17 in the horizontal leg 12 has ends 18 and 19. The end 18 is the most essential part of the invention and, in principle, it can also be devised as a welded strip, perpendicular to the metal strip on the vertical leg 13. The length of the recess 17 substantially corresponds to the stroke of the end of the tiltable closing pipe 10, so that in principle it is also possible to open all feeding openings simultaneously. As yet, no purpose can be stated for this possibility, for even with the danger of fire, the animals are able to open their feeding gates, provided the latch has been centrally disconnected.

A latch 21, pivotable about a shaft, has been arranged in the profile beam 2 in the known manner and such, that its longer end 22 due to its weight, which is greater than that of the shorter end 23, can extend sloping downwards in order to latch the closing pipe 10. If the operating bar 11 in the drawing is slid to the left, then the obliquely rising edge 16 pushes the long end 22 of the latch 21 upwards, and upon further shifting of the operating bar to the left, end 19 of the recess 17 of the horizontal leg 12 pushes the closing pipe 10 towards the open position. In this way, the mutual distance between recesses 14 and 17 is determined.

A vertically extending elongated hole 24 is provided in the vertical leg 13 of the operating member 11. The one leg 6 of the profile beam 2 is provided with a slit 25 that comprises two staggered horizontal portions that are connected by means of a step 25' that corresponds to the elongated hole 24. A pin 26 of a driving means 27 projects through the elongated hole 24 and through the slit 25 or step 25', respectively, said pin being mounted on a lever 29 rotatable about a shaft 28 and projecting outwards through said lever 29 so as to be able to reciprocate it in the elongated hole 24 and the step 25'.

A handle 30 mounted on the driving means 27 does not necessarily have to be operated by hand; it is also possible to connect it with an overthrow mechanism so that sufficient force can be exerted to operate a larger number of closing pipes. Therefore the location of the elongated hole and the step 25' can be chosen without regard to the location of the recesses 14 and 17.

In the presently described feeding gate it is also possible to manually release a particular feeding gate 1 by pushing a finger through a hole 31 in the body 3 of the profile beam 2 against the shorter end 23 of the latch 21. If there is no hole 31 this can also be performed by unlatching the latch at the bottom by pushing its longer end 22.

Other embodiments than those represented in the drawing are also within the scope of the claims, particularly the embodiment in which the operating bar 11 has a U-shaped cross-section or comprises two upright metal plates connected by the above-mentioned strips, respectively.

I claim:

1. A feeding gate comprising a number of feeding openings that can be opened and closed by means of tiltable closing pipes and having a closing mechanism that can be unlatched or latched, respectively, by means of an operating member comprising recesses and being disposed entirely within an upper profile beam by sliding this operating member in the longitudinal direction of the profile beam, said recesses being disposed in the immediate vicinity of a latch that is mounted pivotably in the profile beam, said latch having an end that is automatically received in one of the recesses upon latching, which latching operation can be disconnected for all closing pipes simultaneously or for each closing pipe separately, characterized in that:

the operating member (11) has a first recess (17) having opposite ends for centrally closing and centrally opening the feeding openings, and a second recess (14) terminating in an obliquely rising edge (16) for centrally unlatching the closing pipe (10).

2. A feeding gate according to claim 1, characterized in that:

an elongated hole (24) is provided in the operating member (11) and a staggered slit (25) is provided in the profile beam (2), said staggered slit (25) including a step (25'), and a pin (26) of a driving means (27) of the operating member (11), slidable along the profile beam, projecting through said elongated hole and staggered slit, the step (25') in the staggered slit (25) corresponding to the position in which the latch (21) can latch a closing pipe (10).

3. A feeding gate according to claim 1 wherein one end of the first recess engages the closing pipe to move the pipe to a closed position upon sliding the operating member in one direction within the profile beam.

4. A feeding gate according to claim 3 wherein the other of the ends of the first recess engages the closing pipe to move the pipe to an open position upon sliding the operating member in the opposite direction within the profile beam.

5. An improved feeding gate comprising a plurality of vertically disposed pipes defining feed openings therebetween, a closing pipe within each feed opening and being movable between open and closed positions to open and close the feed opening, a profile beam extending along the upper ends of the vertical pipes and having an open bottom wall through which the closing pipes extend, and a latch mounted on the profile beam and being movable between a latched position holding the closing pipe in the closed position and an unlatched position allowing the closing pipe to move to the open position, the improvement comprising:

an operating member slidably mounted within the profile beam;
first means on the operating member for moving the latch to the unlatched position upon sliding the operating member in a first direction; and
second means on the operting member for moving the closing pipe to the closed position upon sliding the operating member on an opposite second direction.

6. The feeding gate of claim 5 wherein the first means includes an inclined contact surface for engaging and lifting the latch as the operating member slides in the first direction.

7. The feeding gate of claim 5 wherein the second means includes a contact surface for engaging and moving the closing pipe as the operating member slides in the second direction.

8. The feeding gate of claim 7 further comprising third means on the operating member includes a contact surface for moving the closing pipe to the open position upon sliding the operating member in the first direction.

9. The feeding gate of claim 8 wherein the third means includes a contact surface for engaging and moving the closing pipe as the operating member slides in the first direction.

10. The feeding gate of claim 9 wherein the contact surfaces of the second and third means are opposite ends of a recess through which the closing pipe extends.

11. A method of opening and closing a plurality of feed openings in a feeding gate, the gate including a plurality closing pipes movable between open and closed positions to open and close the feed openings, a profile beam through which an end of the closing pipes extends, a latch mounted on the profile beam and being movable between a latched position holding the closing pipe in the closing position and an unlatched position allowing the closing pipe to move to the open position, and an operating member slidably mounted within the profile beam, the method comprising:

sliding the operating member in a first direction within the profile beam such that an inclined surface on the operating member engages the latch to move the latch to the unlatched position;
moving the closing pipes to the open position thereby opening the feed openings;
sliding the operating member in an opposite second direction within the profile beam such that contact surfaces on the operating member engage the closing pipes to simultaneously move all closing pipes to the closed position, thereby closing the feed openings.

12. The method of claim 11 wherein the closing pipes are moved simultaneously to the open position by engagement with second contact surfaces on the operating member as the operating member slides in the first direction.

* * * * *